(12) United States Patent
Hudson

(10) Patent No.: US 11,819,167 B2
(45) Date of Patent: *Nov. 21, 2023

(54) QUICK ACCESS STORAGE CONTAINER SYSTEM

(71) Applicant: Vascito LLC, Lowell, MI (US)

(72) Inventor: Brian Hudson, Lowell, MI (US)

(73) Assignee: Vascito LLC, Lowell, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,400

(22) Filed: Jun. 22, 2022

(65) Prior Publication Data

US 2022/0313022 A1    Oct. 6, 2022

Related U.S. Application Data

(63) Continuation of application No. 16/606,899, filed as application No. PCT/US2018/029739 on Apr. 27, 2018, now Pat. No. 11,412,895.

(60) Provisional application No. 62/490,710, filed on Apr. 27, 2017.

(51) Int. Cl.

| | |
|---|---|
| *A47J 45/02* | (2006.01) |
| *A47J 47/02* | (2006.01) |
| *B65D 25/22* | (2006.01) |
| *F16B 1/00* | (2006.01) |
| *F16M 13/02* | (2006.01) |

(52) U.S. Cl.
CPC ............... *A47J 45/02* (2013.01); *A47J 47/02* (2013.01); *B65D 25/22* (2013.01); *F16B 1/00* (2013.01); *F16M 13/02* (2013.01); *F16B 2001/0035* (2013.01)

(58) Field of Classification Search
CPC .. A47J 45/02; A47J 47/02; A47J 47/01; A47J 47/16; B65D 25/22; F16B 1/00; F16B 2001/0035; F16M 13/02; A23L 11/01
USPC ........................................................ 248/206.5
See application file for complete search history.

(56) References Cited

U.S. PATENT DOCUMENTS

| | | | |
|---|---|---|---|
| 3,337,082 A | 8/1967 | Dorgelys | |
| 5,368,203 A * | 11/1994 | Friedrich | B65D 51/242 |
| | | | 211/DIG. 1 |
| 7,007,818 B2 | 3/2006 | Martin | |
| 7,354,331 B2 * | 4/2008 | Sala | A47G 19/025 |
| | | | 446/175 |
| 7,743,934 B2 | 6/2010 | Martin | |
| 7,748,569 B2 * | 7/2010 | Sunatori | A47G 19/24 |
| | | | 211/DIG. 1 |
| 8,381,949 B2 * | 2/2013 | Sunatori | B65D 47/265 |
| | | | 211/DIG. 1 |

(Continued)

FOREIGN PATENT DOCUMENTS

| | | |
|---|---|---|
| CN | 202234976 U | 5/2012 |
| CN | 202960251 U | 6/2013 |
| KR | 20130110474 A | 10/2013 |

*Primary Examiner* — Muhammad Ijaz
(74) *Attorney, Agent, or Firm* — Price Heneveld LLP

(57) ABSTRACT

A storage system includes a rim assembly and one or more magnets. The rim assembly is configured for attachment to a container to form a container assembly. The one or more magnets are positioned in the container assembly. An effective magnetic force exerted by the one or more magnets on a support surface from which the container assembly is suspended can be varied by adjusting a distance between the support surface and the one or more magnets.

19 Claims, 10 Drawing Sheets

(56) References Cited

U.S. PATENT DOCUMENTS

| | | |
|---|---|---|
| 8,528,775 B2 | 9/2013 | Martin |
| 9,409,678 B2 | 8/2016 | Ding |
| 9,920,877 B2 | 3/2018 | Conti |
| 10,604,308 B2 * | 3/2020 | Harris .................... B65D 51/24 |
| 2001/0052300 A1 * | 12/2001 | Reinholdt ............. B41F 17/001 |
| | | 101/169 |
| 2006/0071014 A1 | 4/2006 | Xiong et al. |
| 2012/0043348 A1 * | 2/2012 | Sunatori ............. B65D 51/242 |
| | | 211/DIG. 1 |
| 2020/0375407 A1 * | 12/2020 | Hudson .................. B65D 25/22 |

* cited by examiner

QUICK ACCESS STORAGE CONTAINER SYSTEM

CROSS-REFERENCE TO RELATED APPLICATIONS

This application is a continuation application of U.S. patent application Ser. No. 16/606,899 filed Oct. 21, 2019, now U.S. Pat. No. 11,412,895, entitled "QUICK ACCESS STORAGE CONTAINER SYSTEM" which claims benefit under 35 U.S.C. section 119(e) of provisional application Ser. No. 62/490,710, filed Apr. 27, 2017, entitled QUICK ACCESS STORAGE CONTAINER SYSTEM, as well as the benefit under 35 U.S.C. section 119(e) of PCT international application number PCT/US2018/029739, entitled QUICK ACCESS STORAGE CONTAINER SYSTEM, the entire contents of which are incorporated herein in their entirety.

FIELD OF THE DISCLOSURE

The present disclosure generally relates to storage systems. More specifically, the present disclosure relates to magnetic storage systems.

BACKGROUND OF THE INVENTION

Many underutilized spaces exist in the daily lives of many consumers. For example, storage areas, such as shelves, often have underutilized space due to the shelves being spaced for the largest item stored on a given shelf, while smaller items on the same shelf have empty space above them. Accordingly, there is a need for storage solutions that decrease the prevalence of underutilized spaces.

SUMMARY OF THE INVENTION

According to a first aspect of the present disclosure, a storage system includes a rim assembly and one or more magnets that are positioned in the rim assembly. The rim assembly selectively attaches to a container to form a container assembly. The rim assembly is configured for selective attachment to a support surface. The rim assembly defines an upper aperture and a lower aperture. The upper aperture and the lower aperture are each dimensioned to permit grasping dexterity within the container. The lower aperture is configured to receive an upper end of the container to which the rim assembly is configured to attach.

Embodiments of the first aspect of the present disclosure can include any one or a combination of the following features:
  the upper aperture and the lower aperture are dimensioned to permit access to an interior of the container by a plurality of fingers of a user;
  the upper aperture and the lower aperture are dimensioned to permit removal of one or more items stored within the interior of the container while the user is grasping the one or more items with the plurality of fingers;
  the upper aperture has a diameter that substantially aligns with a diameter of an opening of the container to which the rim assembly is configured to attach;
  the one or more magnets are attracted to the support surface;
  an engagement between the rim assembly and the container is a threaded engagement;
  the rim assembly includes a channel that is configured to receive the one or more magnets;
  the rim assembly includes a seal rib that extends from a top surface of the rim assembly such that the container is sealed from an external environment upon interaction with the support surface;
  the upper aperture is provided with a leveling edge; and
  a portion of the rim assembly that defines the lower aperture extends around the upper end of the container.

According to a second aspect of the present disclosure, a storage system includes a rim assembly and one or more magnets positioned in the rim assembly. The rim assembly selectively attaches to a container to form a container assembly. The rim assembly is configured for selective attachment to a support surface. The rim assembly defines an upper aperture and a lower aperture. The upper aperture has a diameter that substantially aligns with a diameter of an opening of the container to which the rim assembly is configured to attach. The lower aperture is configured to receive an upper end of the container to which the rim assembly is configured to attach.

Embodiments of the second aspect of the present disclosure can include any one or a combination of the following features:
  the upper aperture and the lower aperture are each dimensioned to permit grasping dexterity through the opening and within the container;
  the upper aperture and the lower aperture are dimensioned to permit access through the opening of the container by a plurality of fingers of a user;
  the upper aperture and the lower aperture are dimensioned to permit removal of one or more items stored within the container while the user is grasping the one or more items with the plurality of fingers;
  the one or more magnets are attracted to the support surface;
  the rim assembly includes a channel that is configured to receive the one or more magnets;
  the rim assembly includes a seal rib that extends from a top surface of the rim assembly such that the container is sealed from an external environment upon interaction with the support surface;
  the upper aperture is provided with a leveling edge; and
  a portion of the rim assembly that defines the lower aperture extends around the upper end of the container.

According to a third aspect of the present disclosure, a storage system includes a rim assembly and one or more magnets positioned in the rim assembly. The rim assembly selectively attaches to a container to form a container assembly. The rim assembly is configured for selective attachment to a support surface. The rim assembly defines an upper aperture and a lower aperture. The upper aperture and the lower aperture are each dimensioned to permit grasping dexterity within the container. The upper aperture has a diameter that substantially aligns with a diameter of an opening of the container to which the rim assembly is configured to attach. The lower aperture is configured to receive an upper end of the container to which the rim assembly is configured to attach. The upper aperture and the lower aperture are dimensioned to permit access to the container by a plurality of fingers of a user. The upper aperture and the lower aperture are dimensioned to permit removal of one or more items stored within the container while the user is grasping the one or more items with the plurality of fingers.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
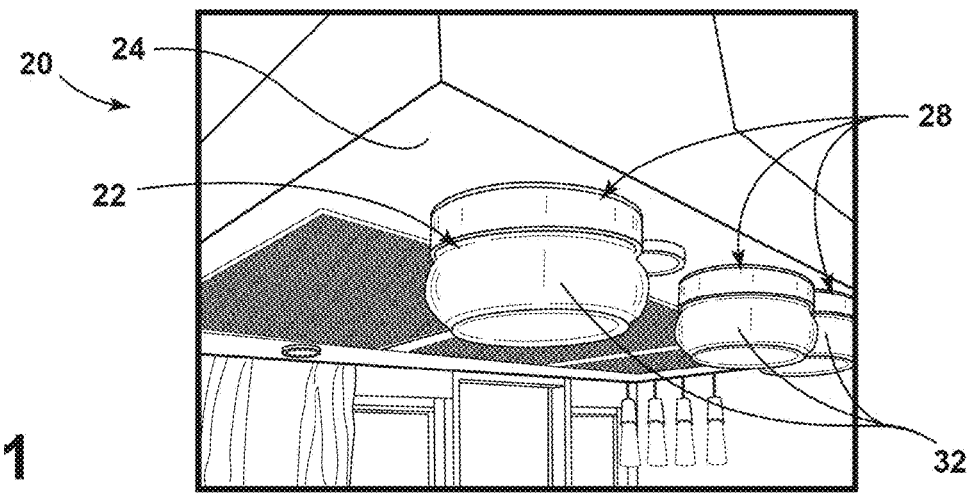
FIG. 1 is a bottom perspective view of a container assembly, illustrating a stored position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a storage system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
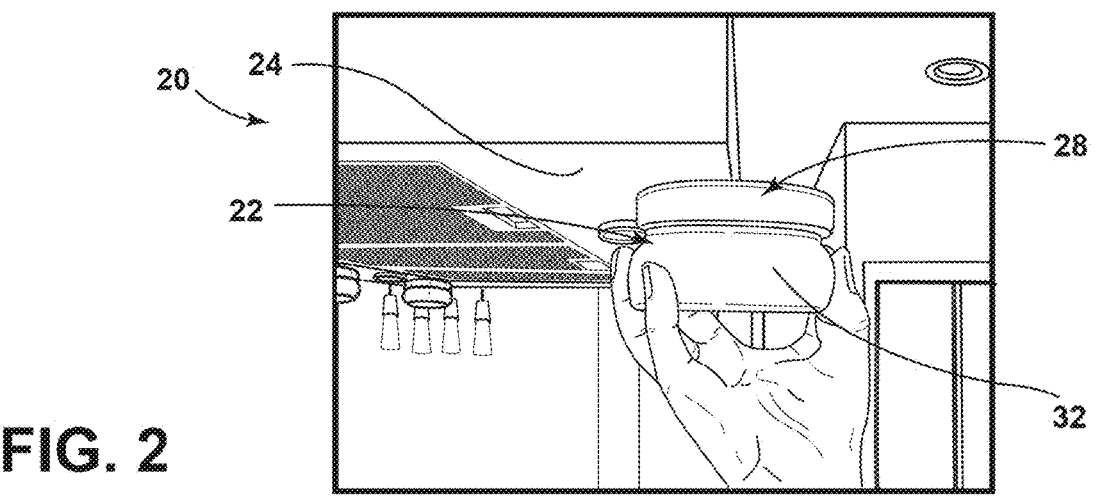
FIG. 2 is a bottom perspective view of the container assembly, illustrating a user removing the container assembly.
Figure 3:
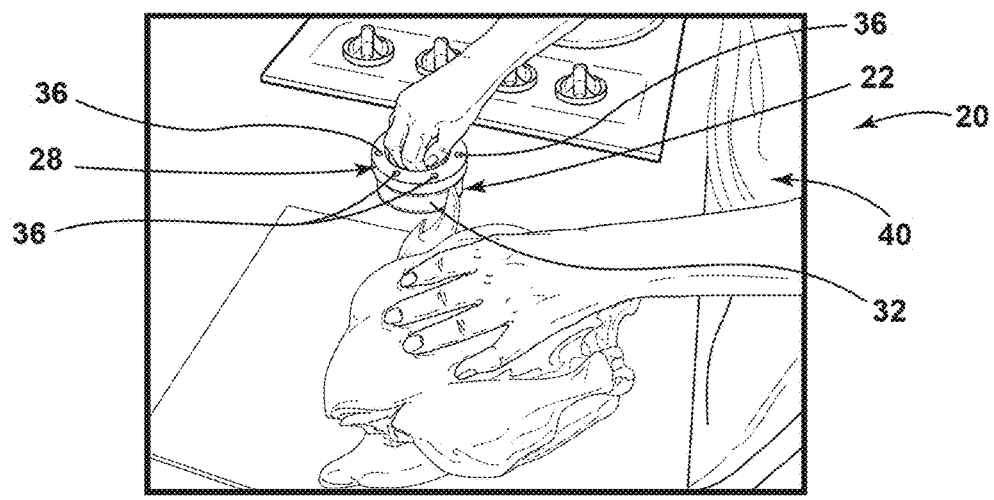
FIG. 3 is a top perspective view of the container assembly in a use position, illustrating the user accessing contents of the container assembly.

Referring to FIGS. 1-3, a storage system 20 is shown with a container assembly 22 that is configured for quick access. The container assembly 22 is shown in a stored position (FIG. 1) and a use position (FIG. 3). The container assembly 22 is transitioned from the stored position to the use position, for example, by actuating the container assembly 22 typically in a lateral direction relative to a support surface 24, see FIG. 2. An at least partial rotation of the container assembly 22 may also be utilized. The container assembly 22 includes a rim assembly 28 and a container 32. The container 32 may be secured to the rim assembly 28 in various ways. For example, the container 32 may be secured to the rim assembly 28, by way of a threaded engagement between threads provided in the rim assembly 28 and on the container 32. Alternatively, the container 32 may be secured to the rim assembly 28 by a compression fit, a detent arrangement, an interference fit, or any other suitable arrangement, including combinations thereof. The rim assembly 28 may be provided with one or more magnets 36 that are configured to retain the container assembly 22 to the support surface 24. The support surface 24 is capable of magnetic interactions (e.g., magnetic metals). In some examples, the storage system 20 may be utilized with substrates or surfaces that are non-magnetic by retrofitting or coupling a magnetic support surface 24 to the non-magnetic substrate (e.g., wooden cabinetry). The rim assembly 28 is provided with a wide mouth design that allows a user 40 to reach completely into the container 32 using fingertips or instruments, such as measuring spoons, for full access. As can be seen in FIGS. 2 and 3, the user 40 is able to operate the container assembly 22 with a single hand. The single-handed use of the container assembly 22 allows the user 40 to transition the container assembly 22 from the stored position to the use position in a single fluid motion. The container assembly 22 is provided without a lid such that actuation from the stored position permits immediate access to the contents stored within the container 32 once the container assembly 22 has left the stored position, without further interaction or actuation by the user 40.

Figure 4:
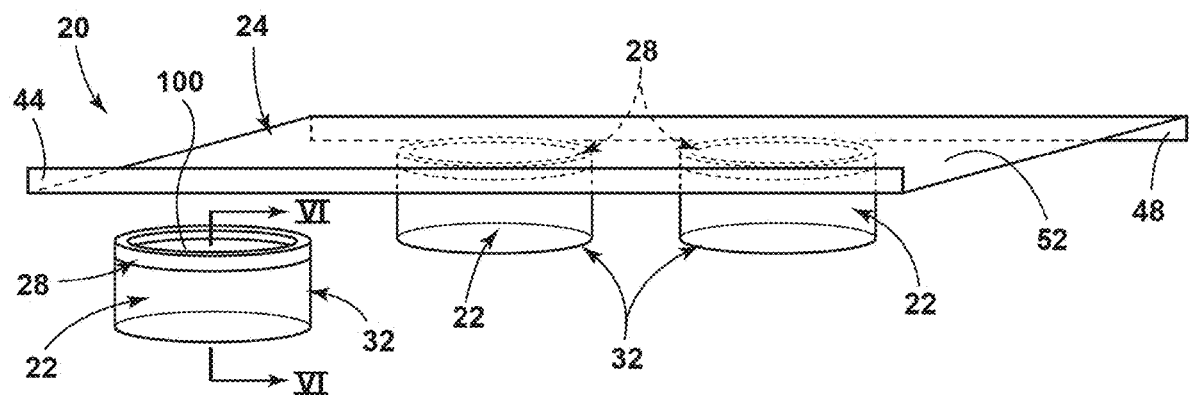
FIG. 4 is a front perspective view of a storage system, according to one aspect of the present disclosure.

Referring now to FIG. 4, the container assembly 22 is shown suspended from the support surface 24. In the depicted example, the support surface 24 may be made of a magnetic material and configured for coupling to a non-magnetic material such that the non-magnetic material may be modified or retrofitted for use with the storage system 20 of the present disclosure. For example, the support surface 24 may be coupled to the non-magnetic material by one or more fasteners. The fasteners may be, but are not limited to, nails, screws, adhesives, double-sided tapes, hook and loop fasteners, plastic sleeves, and/or combinations thereof. The support surface 24 may include a first vertical edge 44 and a second vertical edge 48. The first vertical edge 44 may be an upturned front edge that extends in a vertical direction upward of a horizontal surface 52 of the support surface 24 such that the first vertical edge 44 may engage, for example, with a forward edge of a shelf. The second vertical edge 48 may be a downturned edge that extends in a vertical direction downward of the horizontal surface 52 of the support surface 24 such that the second vertical edge 48 may provide a rearward stop that prevents the user from unintentionally disengaging the rim assembly 28 from the support surface 24 when placing the container assembly 22 in the stored position. Said another way, the second vertical edge 48 prevents the user from accidentally sliding the rim assembly 28 and the container 32 off the support surface 24 when disposing the rim assembly 28 and the container 32 on the support surface 24 after use.

Figure 5:
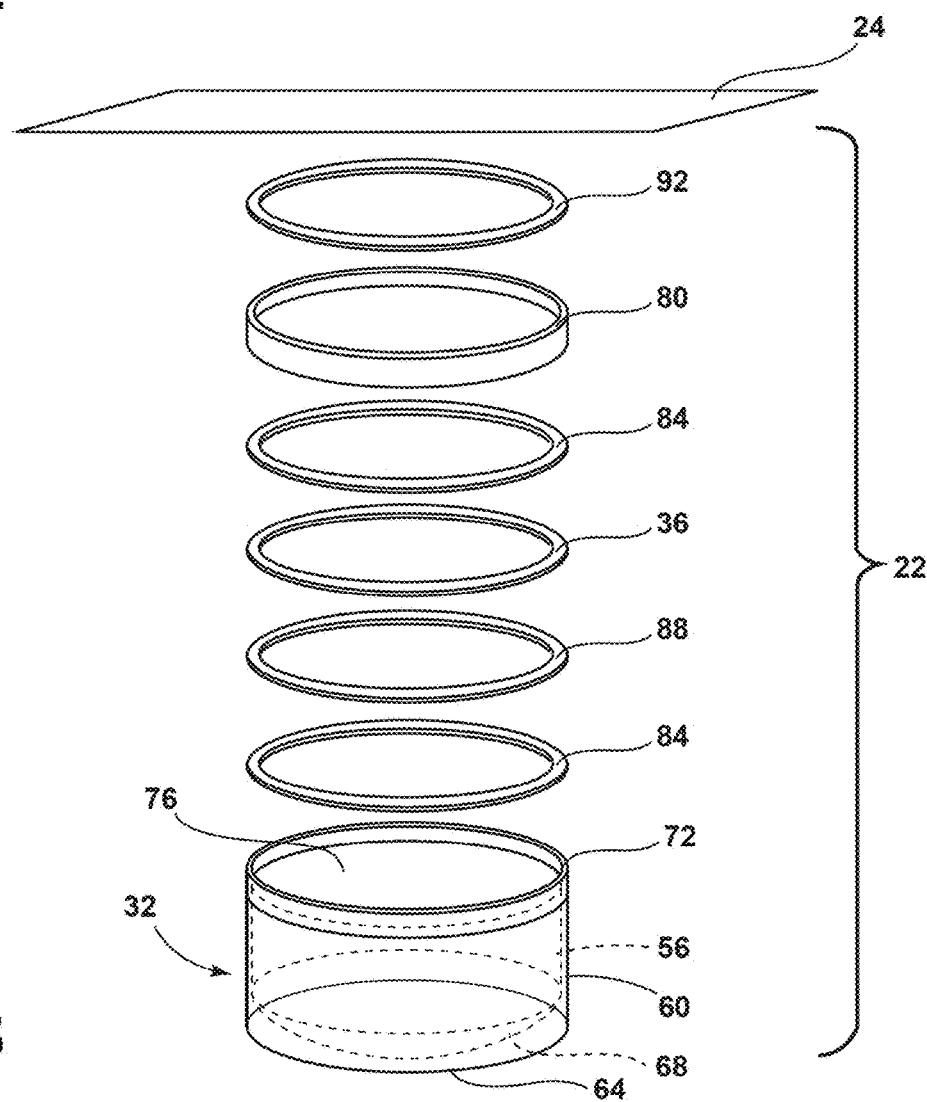
FIG. 5 is an exploded view of the container assembly, according to one aspect of the present disclosure.

Referring to FIG. 5, an exploded view of the container assembly 22 is shown according to one aspect of the present disclosure. The container 32 may be constructed of various materials that include, but are not limited to, glass, wood, plastic, acrylics, metals, metal alloys, synthetic materials, silicone, stone, and/or combinations thereof. The container 32 includes an inner sidewall 56, an outer sidewall 60, and a bottom 64. The inner sidewall 56 may be provided with an inner tapered bottom 68. The rim assembly 28 engages with the container 32 at an attachment point 72. When the rim assembly 28 is coupled to the container 32, a cavity 76 is defined therein that takes on a shape and volume of the container 32. The rim assembly 28 includes a body 80, one or more spacers 84, one or more of the magnets 36, a steel plate 88, and a seal 92. The body 80 of the rim assembly 28 may be alternatively referred to as a housing for the remaining components of the rim assembly 28. The body 80 of the rim assembly 28 may be the component of the rim assembly 28 that couples to the container 32. Other components of the rim assembly 28 may interact with the container 32; however, the body 80 may be the component of the rim assembly 28 that retains the rim assembly 28 to the container 32. The magnets 36 may be disposed among the spacers 84 and above the steel plate 88. It may be beneficial to provide the steel plate 88 with vertical sidewalls such that the steel plate 88 is generally U-shaped and upon placing the magnets 36 within the steel plate 88, the magnets 36 may behave as pot magnets with the open end of the U-shape oriented toward the support surface 24. Pot magnets may amplify, redirect, or focus an effective magnetic field of the magnet 36 by confining the magnetic field to a smaller area or volume. The pot magnets may then enable the user to store heavier items within the container assembly 22 than if pot magnets were not employed. Additionally, the pot magnets may limit the effective magnetic field in a lateral or horizontal direction relative to the rim assembly 28 such that the instruments being used to access the container 32, such as metal measuring spoons, are not attracted to the rim assembly 28 and thereby frustrate the user by spilling or making it more difficult to remove the contents of the container 32 for use.

Referring again to FIG. 5, the spacers 84 may be utilized to vary an effective magnetic force exerted by the magnet 36 on the support surface 24, from which the container assembly 22 is suspended, by adjusting a distance between the support surface 24 and the magnet 36. For example, if a large effective magnetic force is desired, then the spacers 84 may be positioned below the magnets 36 and the steel plate 88 such that the distance between the support surface 24 and the magnet 36 is minimized. Alternatively, if a moderate effective magnetic force is desired, then one of the spacers 84 may be positioned between the magnet 36 and the support surface 24 such that the distance between the support surface 24 and the magnet 36 is increased, while the remaining spacers 84 are positioned below the magnet 36 and the steel plate 88 to store the remaining spacers 84 on board the rim assembly 28. Further, if a small effective magnetic force is desired, then a plurality of the spacers 84 may be positioned between the magnet 36 and the support surface 24 such that the distance between the support surface 24 and the magnet 36 is further increased. The spacers 84 that are not actively being used to adjust the distance between the support surface 24 and the magnet 36 may be stored within the body 80 of the rim assembly 28 between the steel plate 88 and the container 32. The adjustability of the effective magnetic force is beneficial to a consumer because items that are stored in the container assembly 22 may range from lightweight items to very heavy items. The effective magnetic force required to retain the container assembly 22 to the support structure 24 may be drastically different when storing lightweight items compared to very heavy items. As the effective magnetic force increases, the effort required to remove the container assembly 22 from the support surface 24 may similarly increase. Accordingly, it is desirable to provide the effective magnetic force as sufficient to retain the container assembly 22 to the support surface 24 based on the items stored within the container 32 while not providing the effective magnetic force as unnecessarily large or strong. If the effective magnetic force is too large or strong for the items stored within the container 32, then the user may become frustrated with the effort required to remove the container assembly 22. Additionally, if the effective magnetic force is too strong, then removal of the container assembly 22 from the support surface 24 may result in spillage of the contents of the container 32. The container assembly 22 of the present disclosure provides a variable retention force that can be adjusted based upon a weight of the contents of the container 32.

Figure 6:
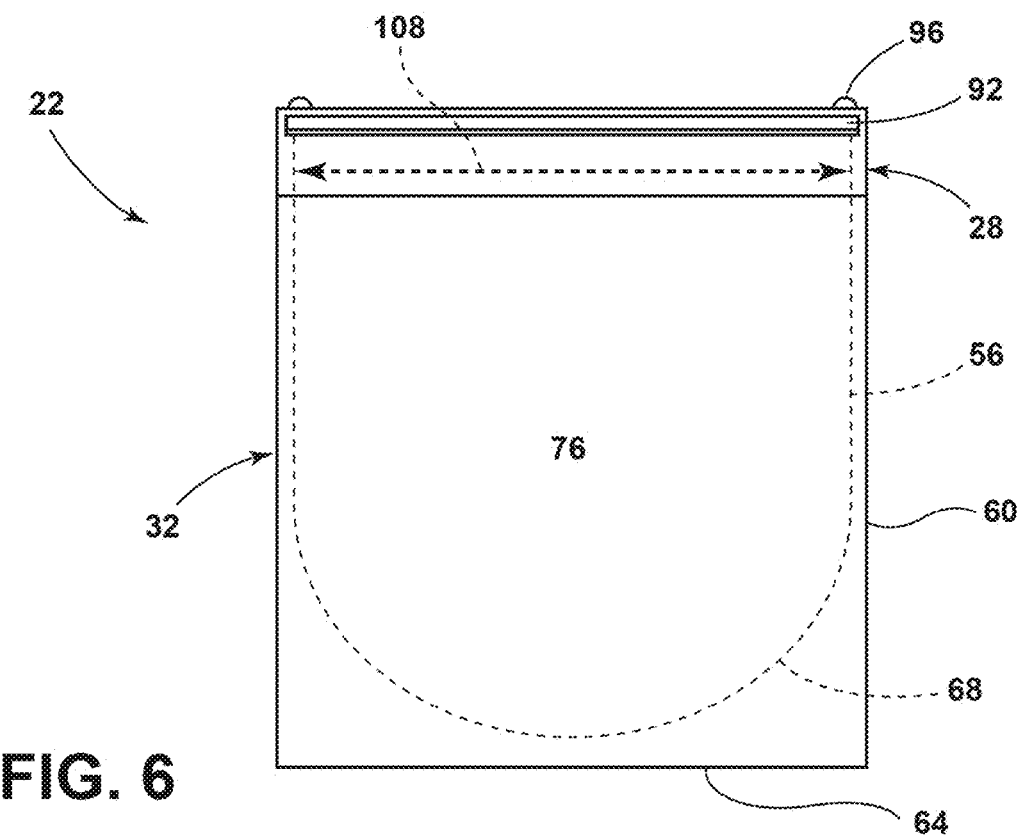
FIG. 6 is a cross-sectional view of the container assembly taken along line VI-VI of FIG. 4, according to one aspect of the present disclosure.
Figure 7:
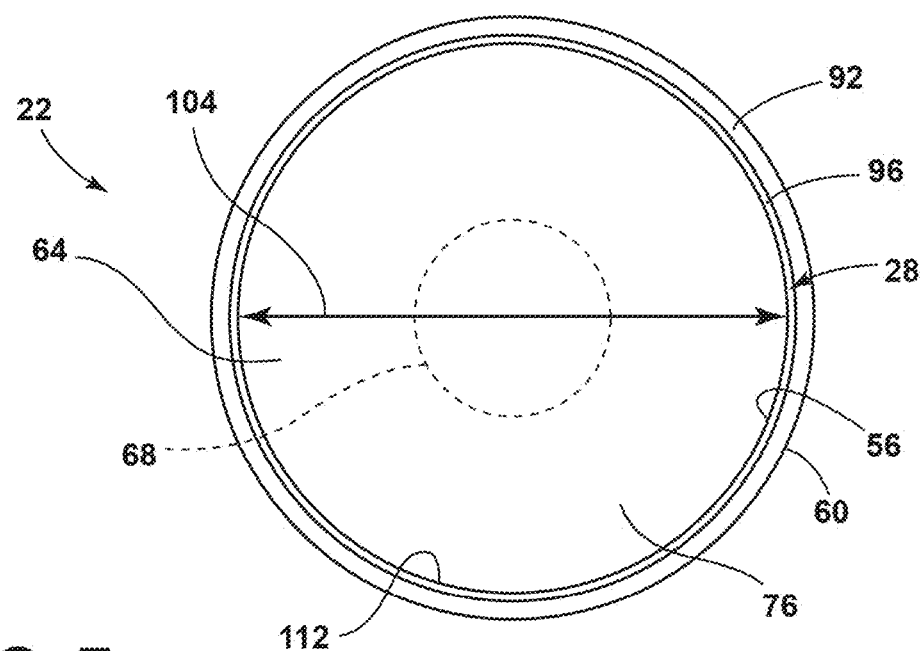
FIG. 7 is a top view of the container assembly, according to one aspect of the present disclosure.

Referring now to FIGS. 6 and 7, the container assembly 22 is shown independent from the support surface 24. The container 32 includes the inner sidewall 56, the outer sidewall 60, the bottom 64, and the inner tapered bottom 68. The rim assembly 28 is coupled to the container 32 at an upper end of the container 32. The rim assembly 28 may be topped by the seal 92. The seal 92 may be coupled to a top surface of the rim assembly 28. Alternatively, the seal 92 may extend through a top surface of the rim assembly 28. In various examples, the seal 92 may include a seal rib 96 that engages with the support surface 24. Accordingly, the seal rib 96 may extend through the top surface of the rim assembly 28. Therefore, when the seal 92 and/or the seal rib 96 engage with the support surface 24, the container 32 may be sealed from an external environment. The seal 92 and the seal rib 96 may be integrally formed or the seal 92 and the seal rib 96 may be separate components. At least one of the seal 92 and the seal rib 96 may reduce a coefficient of friction between the container assembly 22 and the support surface 24. For example, the seal 92 and/or the seal rib 96 may decrease a coefficient of sliding friction between the container assembly 22 and the support surface 24 such that the user may slidably actuate the container assembly 22 relative to the support surface 24 with greater ease. Accordingly, greater effort may be required to remove the container assembly 22 from the support surface 24 if the user were to solely vertically actuate the container assembly 22 away from the support surface 24, for example, with a downward pull of the container assembly 22. In some examples, the seal 92 may be omitted and the seal rib 96 may serve as the seal 92 and a friction-reducing member. It may be beneficial to construct the seal rib 96 and various components of the rim assembly 28 from a strong, durable, low-friction, and/or food-safe material, such as high-density polyethylene (HDPE).

According to one aspect of the device, the seal 92 and/or the seal rib 96 may be provided as a high-friction material that has a relatively high coefficient of friction with the support surface 24. For example, the seal 92 and/or the seal rib 96 may be manufactured from a tacky or sticky material that increases the coefficient of friction between the rim assembly 28 and the support surface 24. The benefits of such an example are that the container assembly 22 would be less likely to experience unintentional horizontal motion along the support surface 24, such as that which may be experienced due to vibrations in the environment within which the container assembly 22 is stored. For example, when the container assembly is utilized in proximity to a moving component (e.g., dishwasher, range hood fan, blender, washing machine, power tools, etc.) or within a vessel (vehicle, motor vehicle, automobile, marine vehicle, airplane, etc.). When the coefficient of friction between the rim assembly 28 and the support surface 24 is increased, it may be beneficial to provide the user with additional features that may aid in removing the container assembly from the support surface 24. For example, the container assembly 22 may be provided with a button or switch that, upon actuation, interferes with the effective magnetic force 124, extends a protrusion from the rim assembly 28 to separate the container assembly 22 from the support surface 24, or generally aids in the removal of the container assembly 22 from the support surface 24. Additionally or alternatively, the support surface 24 may be provided with a generally V-shaped structure or drip edge that is provided with an increasing vertical thickness as the first vertical edge 44 of the support surface 24 is approached to increase the distance 128 between the one or more magnets 36 and the support surface 24. It is contemplated that many mechanisms may be employed individually or in combination to aid in the removal of the container assembly 22 from the support surface 24 and those disclosed herein are exemplary aspects of the present disclosure and are not intended to limit the scope of the disclosure in any way.

Referring again to FIGS. 6 and 7, the rim assembly 28 is provided with an aperture 100 (see FIG. 4) that has a diameter 104 that substantially corresponds with a diameter 108 of an opening 112 of the container 32. The opening 112 of the container 32 may generally correspond with the inner sidewall 56 of the container 32. Accordingly, the diameter 104 of the aperture 100 may substantially correspond with a distance between opposing sides of the inner sidewall 56 of the container 32. In some examples, a diameter of the cavity 76 may be greater than the diameter 108 of the opening 112. By providing the aperture 100 with the diameter 104 that substantially corresponds with the diameter 108 of the opening 112 of the container 32, the user is provided with a large access point to the contents of the container assembly 22. Accordingly, the user may access the contents of the container assembly 22 with measuring spoons, measuring cups, and/or large portions of the user's fingers. For example, the user may access the contents of the container assembly 22 with a one-cup measuring cup. When the user utilizes their fingers to access the contents of the container assembly 22, the user may insert a multitude of fingers and their thumb into the container assembly 22 to allow for sufficient grasping dexterity to manipulate the contents of the container assembly 22 (see FIG. 3).

Figure 8:
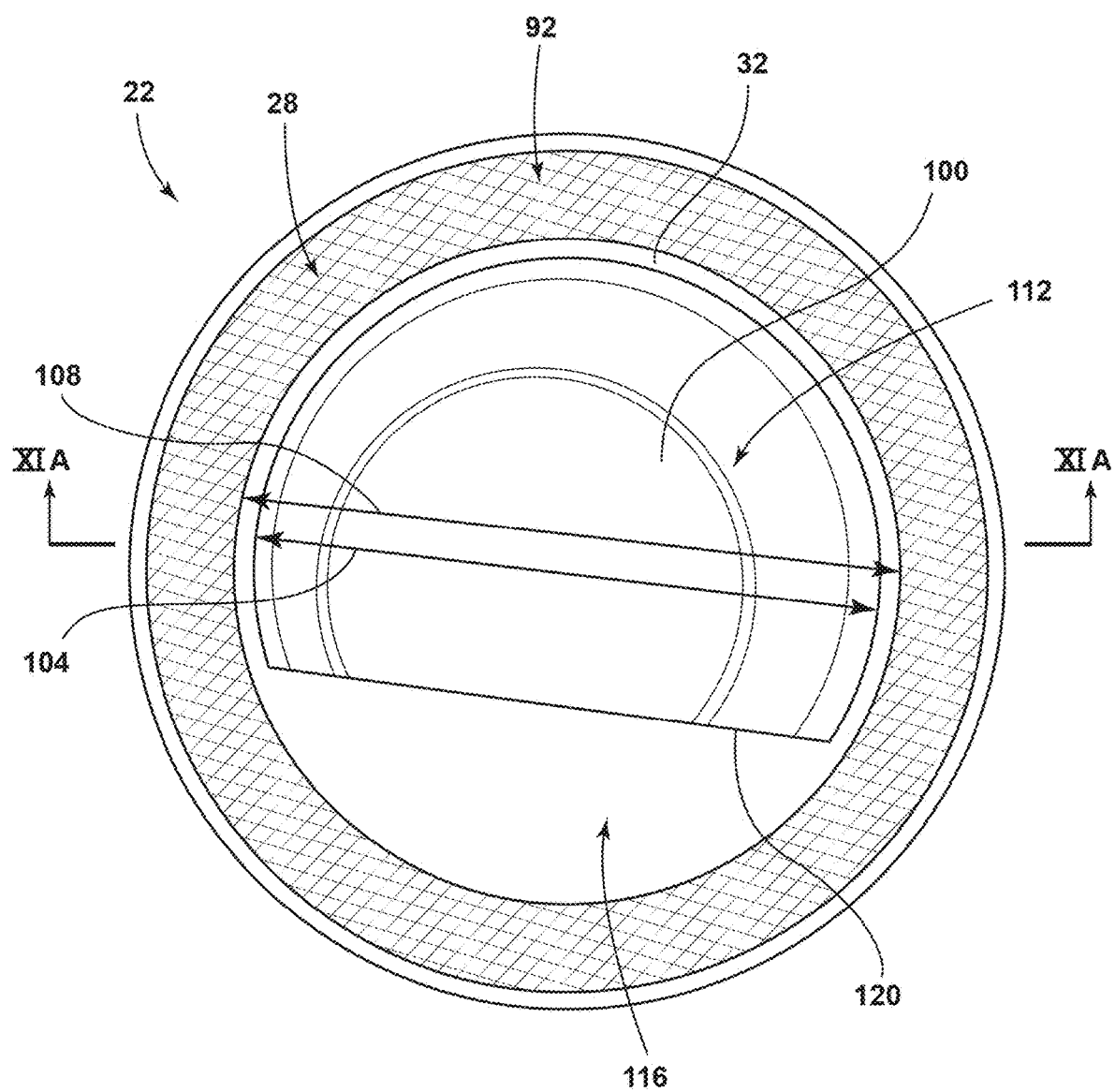
FIG. 8 is a top view of the container assembly, according to another aspect of the present disclosure.

Referring to FIG. 8, the rim assembly 28 is shown according to one aspect of the present disclosure. The rim assembly 28 is coupled to the container 32 to provide the container assembly 22. The rim assembly 28 is provided with the seal 92, which may include the seal rib 96. The diameter 104 of the aperture 100 can substantially correspond with the diameter 108 of the opening 112. The rim assembly 28 is equipped with a leveling edge 116. The leveling edge 116 extends radially inward from the rim assembly 28 to cover at least a portion of the aperture 100 such that a portion of the aperture 100 does not substantially correspond with the opening 112 in the container 32. The leveling edge 116 may be provided with a side 120 that is substantially linear such that a measuring spoon or measuring cup may be leveled against the side 120. For example, when the user inserts a measuring spoon into the container assembly 22 by way of the aperture 100, the user may fill or scoop the contents from the container 32 into the measuring spoon such that the measuring spoon is heaping or rounded with the contents of the container 32. Next, the user may drag a top surface of the measuring spoon against an underside of the leveling edge 116 and/or the side 120 such that excess contents in the measuring spoon may be returned to the container 32, thereby providing a level and accurately measured amount to the measuring spoon.

Figure 9A:
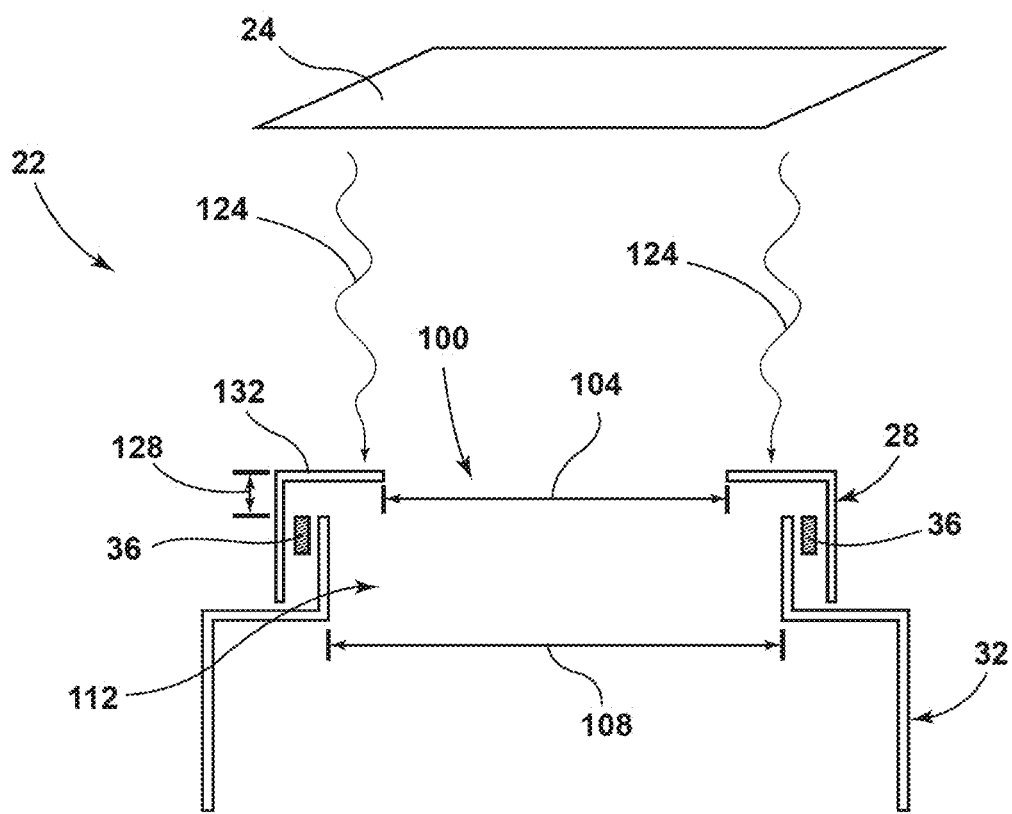
FIG. 9A is a schematic view of a rim assembly of the container assembly, illustrating a first portion and a second portion in a retracted position, according to one aspect of the present disclosure.
Figure 9B:
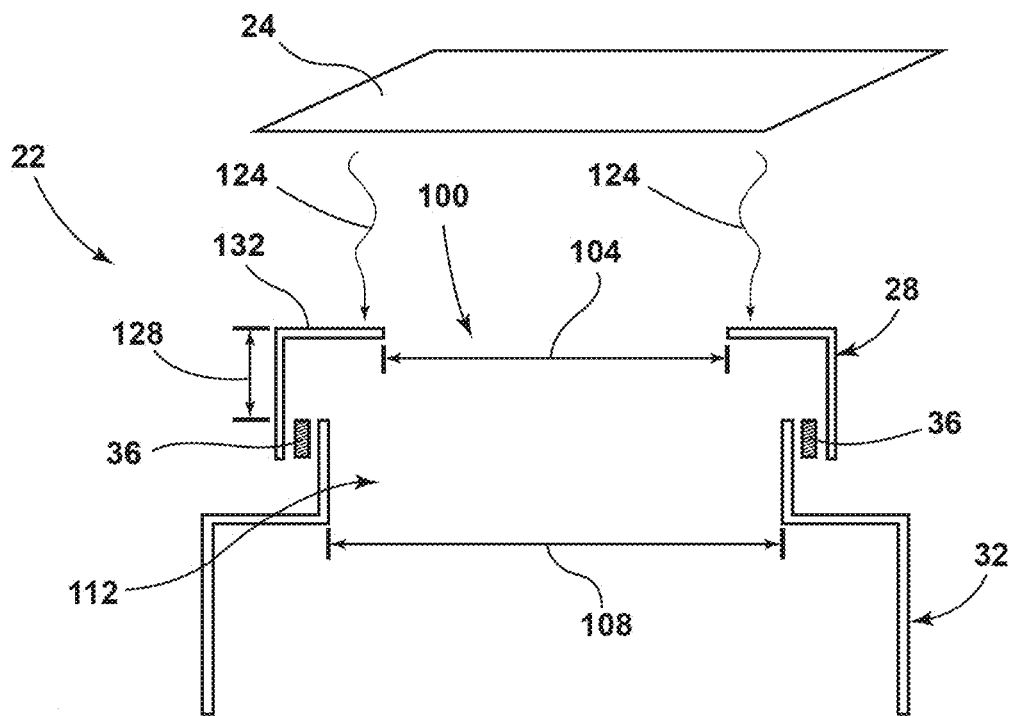
FIG. 9B is a schematic view of the rim assembly of the container assembly, illustrating the first portion and the second portion in an extended position, according to one aspect of the present disclosure.

Referring now to FIGS. 9A and 9B, a schematic representation of one aspect of the present disclosure is shown. The container assembly 22 includes the rim assembly 28 and the container 32. In various examples, the diameter 104 of the aperture 100 substantially corresponds with the diameter 108 of the opening 112. An effective magnetic force 124 exerted on the support surface 24 by the one or more magnets 36 can be varied by adjusting a distance 128 between a top surface 132 of the rim assembly 28 and the one or more magnets 36. This movement varies the location of the top surface 132 within the magnetic field of the one or more magnets 36. As the distance 128 between the top surface 132 of the rim assembly 28 and the one or more magnets 36 increases, a magnitude of the effective magnetic force 124 exerted by the one or more magnets 36 decreases. Similarly, as the distance 128 between the top surface 132 of the rim assembly 28 and the one or more magnets 36 decreases, the magnitude of the effective magnetic force 124 exerted by the one or more magnets 36 increases. The adjustment in the effective magnetic force 124 is indicated by the decrease in a length of the lead lines that represent the effective magnetic force 124 when FIG. 9A is compared with FIG. 9B.

Figure 10:
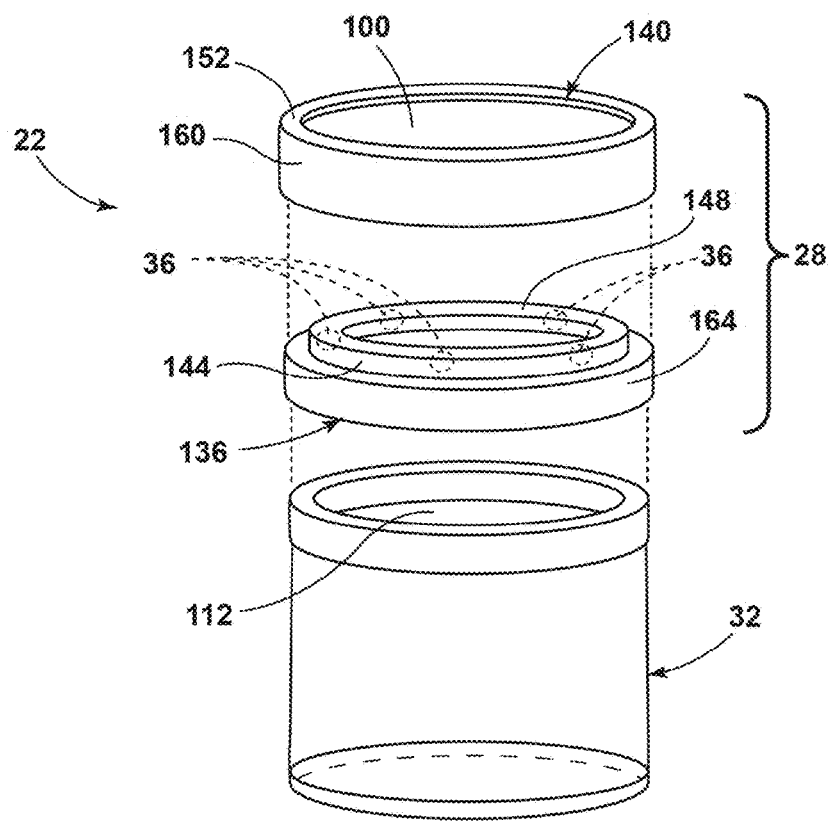
FIG. 10 is an exploded view of the container assembly, illustrating the first portion and the second portion, according to one aspect of the present disclosure.
Figures 11A, 11B:
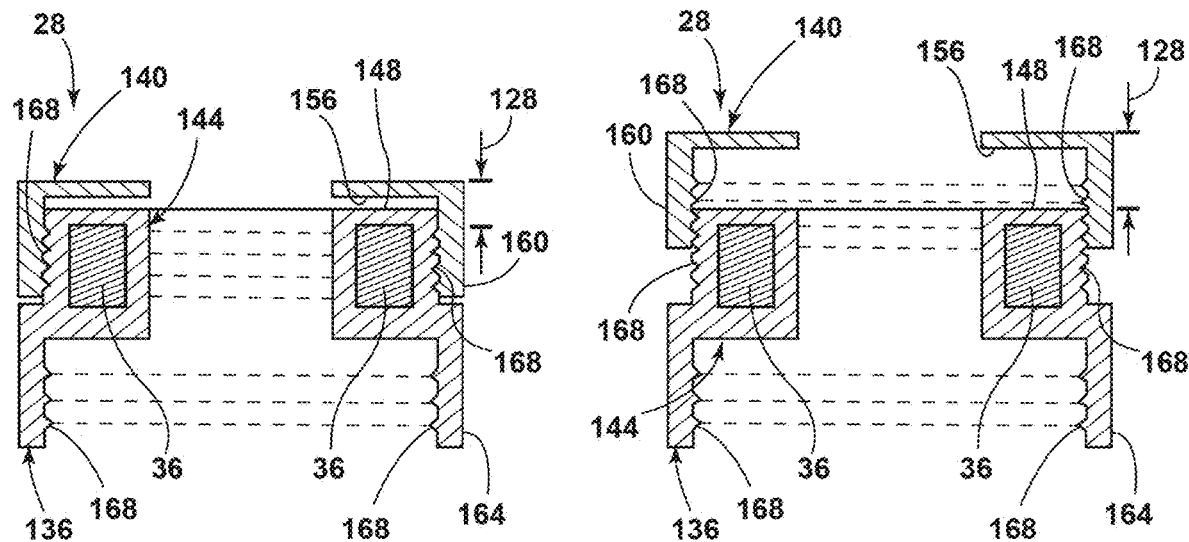
FIG. 11A is a cross-sectional view of the rim assembly, taken along line XIA-XIA of FIG. 8, illustrating an engagement between the first portion and the second portion with the second portion in the retracted position, according to one aspect of the present disclosure.
FIG. 11B is a cross-sectional view of the rim assembly, taken along line XIA-XIA of FIG. 8, illustrating the engagement between the first portion and the second portion with the second portion in the extended position, according to one aspect of the present disclosure.

Referring to FIGS. 10-11B, the rim assembly 28 may include a first portion 136 and a second portion 140, according to an exemplary aspect of the present disclosure. The first portion 136 may include a raised portion 144. The raised portion 144 may be disposed radially inward from a perimeter of the first portion 136 such that an inner wall of the first portion 136 and the raised portion 144 are substantially coplanar and define an inner diameter of the first portion 136. The one or more magnets 36 may be positioned within or proximal to the raised portion 144. The one or more magnets 36 may be spaced generally equidistant about the first portion 136. It is contemplated that it may be desirable to provide a region of the container assembly 22 that lacks one of the magnets 36 or spaces the one or more magnets 36 further apart from one another. In an exemplary aspect of the device, three magnets 36 are spaced about ninety degrees from one another while providing two of the three magnets 36 as spaced about one-hundred-eighty degrees from one another. By so positioning the magnets 36, it may be easier for the user to pry or rotate the container assembly 22 off the support surface 24 rather than sliding the container assembly 22 off the support surface 24. An outer diameter of the raised portion 144 may correspond with an inner diameter of the second portion 140 such that the raised portion 144 nests within the second portion 140. Accordingly, a top surface 148 of the raised portion 144 may be coplanar with a top surface 152 of the second portion 140. Alternatively, the top surface 148 of the raised portion 144 may be configured to engage with, or be in close proximity to, an underside 156 of the second portion 140 when the second portion 140 is in a fully lowered position (FIG. 11A). In some examples, exterior walls 160 of the second portion 140 may extend over exterior walls 164 of the first portion 136 such that the user is presented with a substantially smooth surface while also protecting engagement portions (e.g., threads) of the first portion 136 that interact with the second portion 140 to enable coupling of the first and second portions 136, 140.

Referring again to FIGS. 10-11B, in one aspect of the present disclosure, as depicted in FIG. 10, the first portion 136 and the second portion 140 may couple to one another through a compression or interference fit where the first portion 136 and/or the raised portion 144 fits within the inner diameter of the second portion 140. For example, the outer diameter of the exterior wall 164 of the first portion 136 may press upon an inner surface of the exterior wall 160 of the second portion 140 such that the first portion 136 and the second portion 140 are retained together as the rim assembly 28. In such an example, the exterior walls 160, 164 of the first and second portions 136, 140 may include detents or bumps that represent positions of the second portion 140 relative to the first portion 136 that provide the adjustability in the effective magnetic force 124.

Referring further to FIGS. 10-11B, in another aspect of the present disclosure, as depicted in FIGS. 11A and 11B, the first portion 136 and the second portion 140 may couple to one another through a threaded engagement. The threaded engagement is accomplished by a plurality of threaded regions 168 on the rim assembly 28. The raised portion 144 of the first portion 136 may be provided with one of the threaded regions 168 disposed on an exterior surface of the outer diameter that are configured to engage with the second portion 140 at one of the threaded regions 168 that is disposed on an inner surface of the inner diameter of the second portion 140. Accordingly, the distance 128 between the one or more magnets 36 and the top surface 152 of the second portion 140 may be adjusted by tightening (FIG. 11A) or loosening (FIG. 11B) the second portion 140 relative to the first portion 136. A distance between the one or more magnets 36 and the container 32 may remain constant independent of a vertical position of the second portion 140. An inner surface of the first portion 136 may also be provided with one of the threaded regions 168 disposed thereon and configured to engage with one of the threaded regions 168 that may be provided on the container 32. A direction of rotational motion that tightens and loosens the rim assembly 28 relative to the container 32 may be the same as a direction of rotational motion that tightens and loosens the second portion 140 relative to the first portion 136. Said another way, the rim assembly 28 may be tightened onto the container 32 by clockwise motion and the second portion 140 may be tightened (i.e., distance 128 decreased) by clockwise motion of the second portion 140 relative to the first portion 136. Similarly, the rim assembly 28 may be loosened from the container 32 by counter-clockwise motion and the second portion 140 may be loosened (i.e., distance 128 increased) by counter-clockwise motion of the second portion 140 relative to the first portion 136. An abutment in the threads between the first and second portions 136, 140 can at least partially resist a complete separation of the first and second portions 136, 140.

Alternatively, the direction of rotational motion that tightens and loosens the rim assembly 28 relative to the container 32 may be opposite from the direction of rotational motion that tightens and loosens the second portion 140 relative to the first portion 136. For example, the rim assembly 28 may be tightened onto the container 32 by clockwise motion and the second portion 140 may be tightened (i.e., distance 128 decreased) by counter-clockwise motion of the second portion 140 relative to the first portion 136. Similarly, the rim assembly 28 may be loosened from the container 32 by counter-clockwise motion and the second portion 140 may be loosened (i.e., distance 128 increased) by clockwise motion of the second portion 140 relative to the first portion 136. It may be beneficial to provide the direction of rotational motion that tightens and loosens the rim assembly 28 relative to the container 32 opposite from the direction of rotational motion that tightens and loosens the second portion 140 relative to the first portion 136 to avoid unintentional loosening of the rim assembly 28 from the container 32 during adjustments of the effective magnetic force 124.

Figure 12:
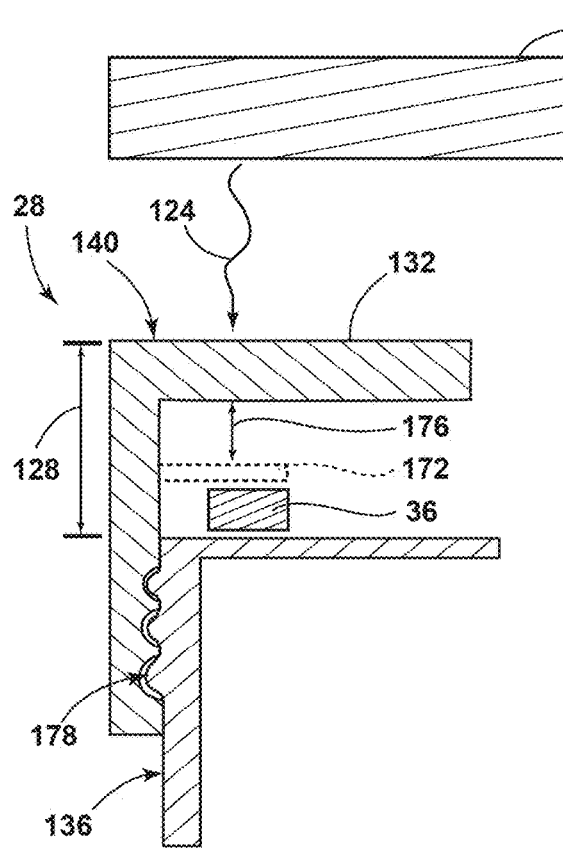
FIG. 12 is a cross-sectional view, taken along line XIA-XIA of FIG. 8, illustrating an interaction between one or more magnets and the first and second portions, according to one aspect of the present disclosure.
Figure 13:
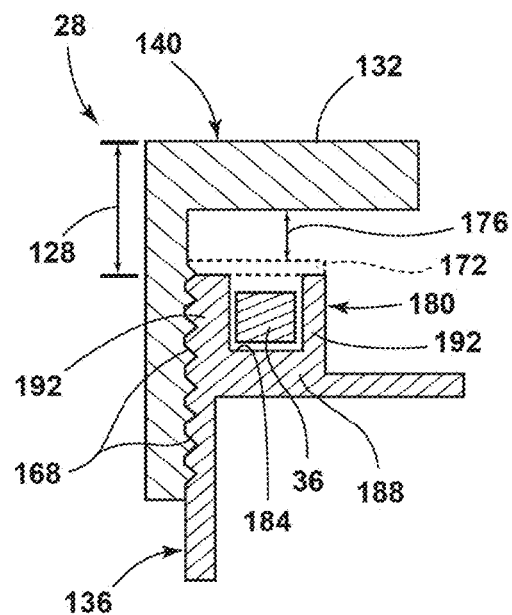
FIG. 13 is a cross-sectional view, taken along line XIA-XIA of FIG. 8, illustrating the interaction between one or more magnets and the first and second portions, according to another aspect of the present disclosure.

Referring now to FIGS. 12 and 13, the rim assembly 28 may be provided with an upper flange 172 that is configured to secure the one or more magnets 36 to the first portion 136. The upper flange 172 may be movable relative to the second portion 140, as indicated by the arrow that corresponds to a distance 176 between the underside 156 of the second portion 140 and the upper flange 172. The upper flange 172 may also be movable relative to the one or more magnets 36. The one or more magnets 36 may be held to the first portion 136 by an adhesive (FIG. 12). Alternatively, the one or more magnets 36 may be held to the first portion 136 by the upper flange 172 when the upper flange 172 acts as a retention ring that maintains steady pressure to the one or more magnets 36 such that the one or more magnets 36 are prevented from unintentional vertical motion (e.g., when attracted to the support surface 24) or horizontal motion (e.g., when attracted to another of the one or more magnets 36). An example of a detent mechanism 178 is depicted in FIG. 12 at the coupling between the first portion 136 and the second portion 140. It may be beneficial to provide the detent mechanism 178 with at least two points of contact in a given arrangement of the distance 128 of the one or more magnets 36 to the top surface 132 of the rim assembly 28. In the depicted example, the detent mechanism 178 is in an intermediate position and may be capable of vertical actuation by one detent in both the upward and downward directions to reach a raised and a lowered position, respectively.

Referring again to FIGS. 12 and 13, in some examples, the one or more magnets 36 may be received and/or retained within a channel 180 that is provided in the first portion 136. The channel 180 may include the threaded regions 168 provided, for example, on the first portion 136. The channel 180 may be provided with a vertically sloped magnet-bearing surface 184 that is disposed on a floor 188 of the channel 180. The channel 180 may be capped with the upper flange 172 and channel sidewalls 192 may extend between the floor 188 and the upper flange 172. The vertically sloped magnet-bearing surface 184 may be configured such that a vertical height of the floor 188 of the channel 180 varies in a radial direction about the channel 180 such that the distance 128 between the support surface 24 and the one or more magnets 36 can be adjusted to vary the effective magnetic force 124 exerted on the support surface 24 when the container assembly 22 is in the stored position. The adjustment of the effective magnetic force 124 in such an example that employs the vertically sloped magnet-bearing surface 184 may be accomplished by rotational actuation of the rim assembly 28 such that the one or more magnets 36 are moved laterally along the vertically sloped magnet-bearing surface 184. The distance 128 may alternatively be referred to as the distance 128 between the one or more magnets 36 and the top surface 132 of the rim assembly 28 as the top surface 132 of the rim assembly 28 may directly physically contact the support surface 24. This direct physical contact between the top surface 132 of the rim assembly 28 and the support surface 24 may include the seal rib 96 discussed above.

Figure 14A:
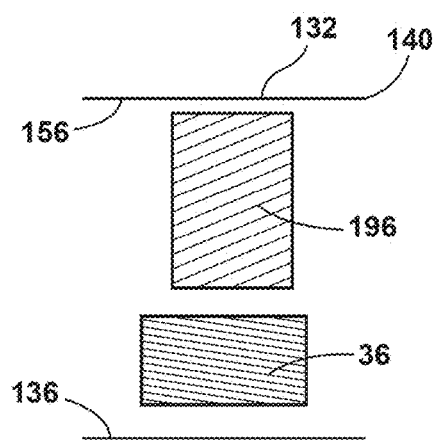
FIG. 14A is a schematic view of an interaction between one of the one or more magnets and a resilient member, illustrating an expanded position of the resilient member.
Figure 14B:
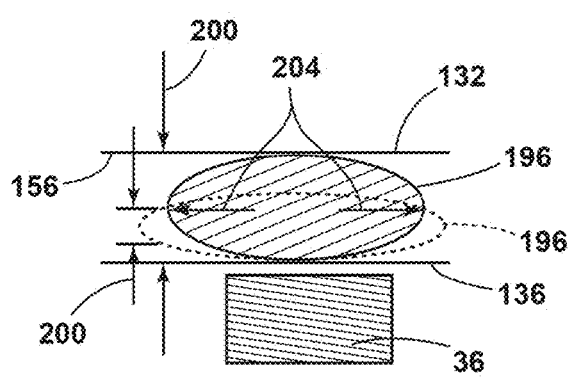
FIG. 14B is a schematic view of the interaction between one of the one or more magnets and the resilient member, illustrating a compressed position of the resilient member.

Referring to FIGS. 14A and 14B, in another aspect of the present disclosure, the one or more magnets 36 may be separated from the top surface 132 of the rim assembly 28 by a resilient member 196. The resilient member 196 may be disposed between the first portion 136 and the second portion 140. Alternatively, the resilient member 196 may be positioned between the one or more magnets 36 and the underside 156 of the second portion 140. The resilient member 196, in some examples, may be one of the spacers 84. Regardless of which components the resilient member 196 is sandwiched or contained between, the resilient member 196 is provided with a level of compressibility. The level of compressibility may be provided by the resilient member 196 being made from a resilient material, such as rubbers, polymers, plastics, etc. Accordingly, the effective magnetic force 124 exerted by the one or more magnets 36 may be varied by decreasing a distance 200 between the components that are compressing, sandwiching, or squeezing the resilient member 196. For example, decreasing the distance 200 between the components that are compressing the resilient member 196 may cause the resilient member 196 to expand in a direction perpendicular to the compression force (see arrows 204) while the resilient member 196 compresses in a direction parallel to the compression force.

Figure 15:
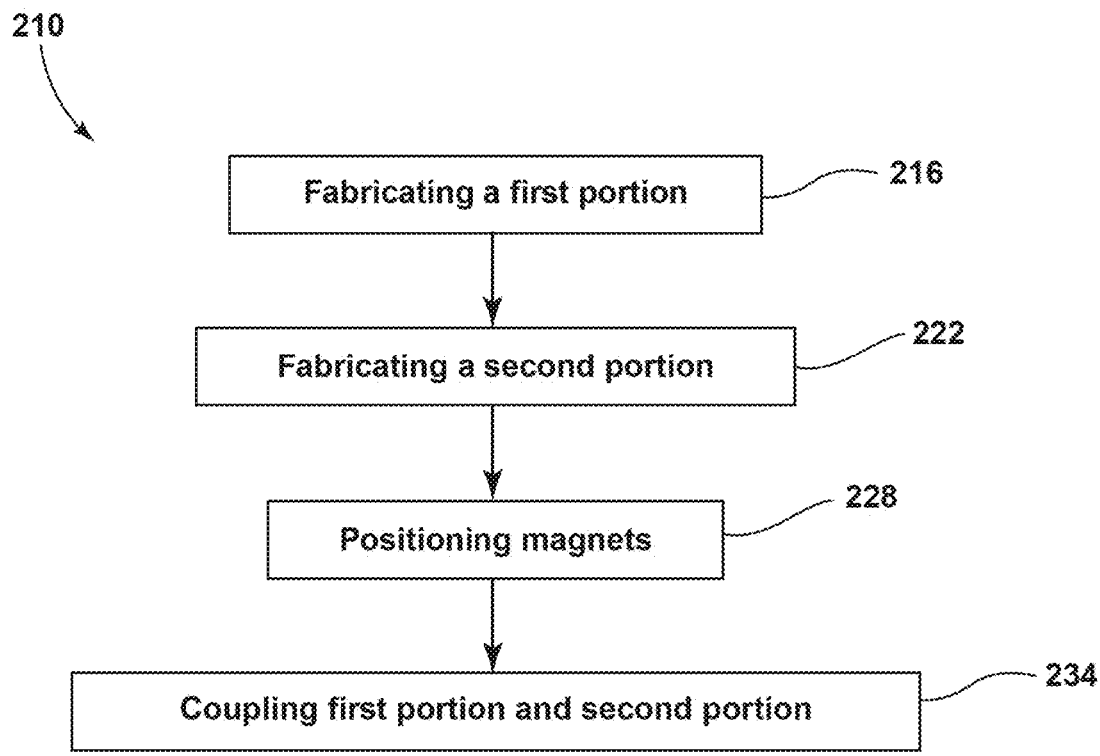
FIG. 15 is a flow chart illustrating a method of making a storage system, according to one aspect of the present disclosure.

Referring now to FIG. 15, a method 210 of making a storage system includes the step 216 of fabricating the first portion 136 of the rim assembly 28 that is configured to engage with the container 32. Next, the method 210 includes the step 222 of fabricating the second portion 140 of the rim assembly 28 that is configured to engage with the first portion 136. Step 228 includes positioning the one or more magnets 36 within the rim assembly 28. Finally, the method 210 may end with the step 234 of coupling the first portion and the second portion of the rim assembly in a manner that permits adjustment of a vertical position of the second portion 140 relative to the first portion 136. The step 228 of positioning the one or more magnets 36 within the rim assembly 28 may position the one or more magnets 36 in the first portion 136 of the rim assembly 28. The method 210 may further include the step of providing the aperture 100 in the rim assembly 28 that has the diameter 104 that substantially corresponds to the diameter 108 of the opening 112 in the container 32.

Figure 16:
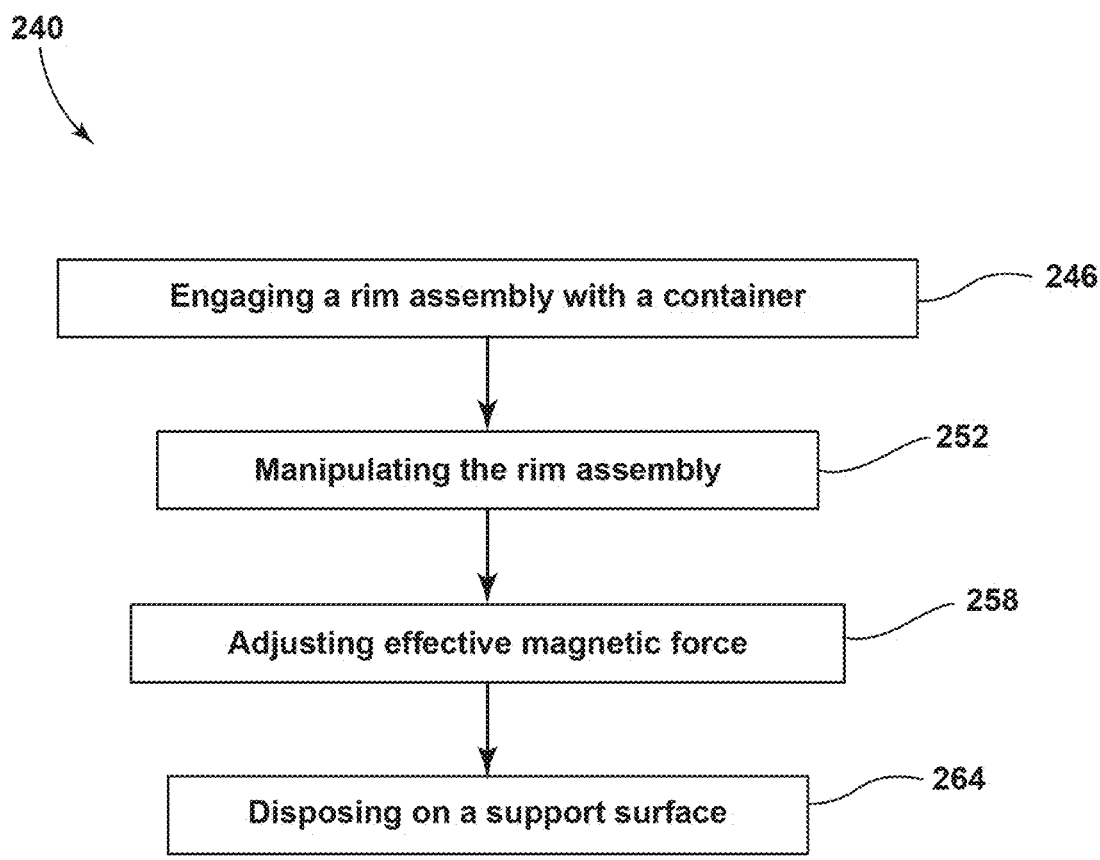
FIG. 16 is a flow chart illustrating a method of adjusting a retention force in the storage system.

Referring to FIG. 16, a method 240 of adjusting a retention force in a storage system includes step 246 of engaging the rim assembly 28 with the container 32 to form the container assembly 22. The method 240 also includes step 252 of manipulating the rim assembly 28. Step 258 includes adjusting the effective magnetic force 124 of one or more of the magnets 36. Finally, method 240 may end with step 264 of disposing the container assembly 22 on the support surface 24. The step 252 of manipulating the rim assembly 28 may further include the step of adjusting the distance 128 between the support surface 24 and the one or more magnets 36. The step of adjusting the distance 128 between the support surface 24 and the one or more magnets 36 may further include the step of adjusting a spatial relationship between the first portion 136 and the second portion 140 of the rim assembly 28.

Figure 17:
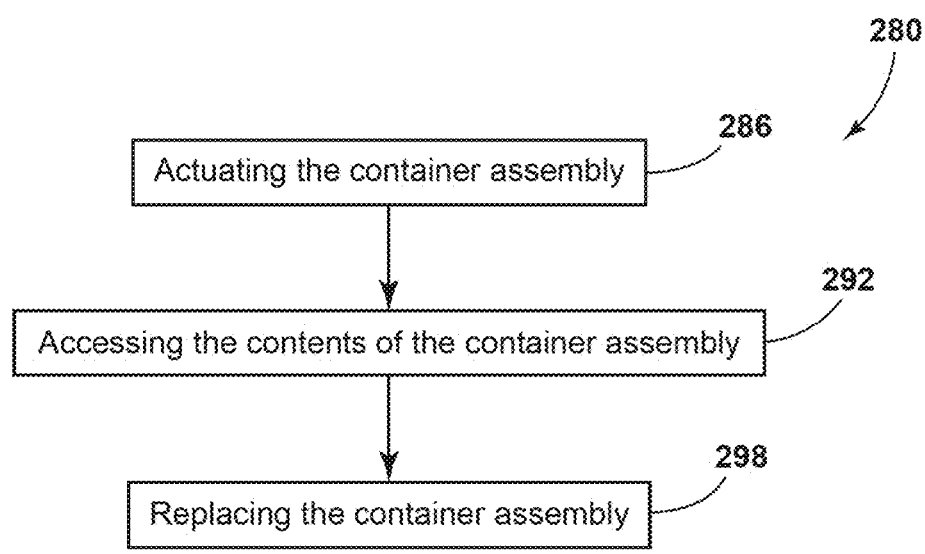
FIG. 17 is a flow chart illustrating a method of accessing the container assembly.

Referring now to FIG. 17, a method 280 of accessing a container assembly 22 includes step 286 of actuating the container assembly 22 from a stored and sealed state (FIG. 1) to a fully accessible state (FIG. 3). The actuation in step 286 is carried out in a one-handed fashion and is carried out in a single fluid motion. The method 280 also includes step 292 of accessing the contents of the container assembly 22 through the aperture 100 in the rim assembly 28. The method 280 further includes step 298 of replacing the container assembly 22 in the stored and sealed state from the fully accessible state.

The one or more magnets 36 that are employed may be of various sizes and shapes. It is contemplated that the rim assembly 28 may be manufactured from a magnetically infused material rather than discrete magnets 36. The one or more magnets 36 may be ring magnets. The adjustability of the rim assembly 28 allows for varying of the effective magnetic force 124 exerted by the one or more magnets 36. Accordingly, the user 40 may adjust the effective magnetic force 124 based on the items that are intended to be stored within the container 32. Alternatively, the rim assembly 28 may be manufactured with varying effective magnetic forces 124 such that the user may purchase rim assemblies 28 with different levels of effective magnetic force 124 while the user 40 is unable to adjust the effective magnetic force 124 after purchase. For example, the rim assembly 28 may be manufactured with the spacers 84 and the manufacturer may selectively position the spacers 84 relative to the one or more magnets 36 such that various effective magnetic force 124 offerings are provided to the user without granting the user access to the spacers 84 and/or the one or more magnets 36 such that the user is prevented from being able to adjust the effective magnetic force 124 after purchasing the rim assembly 28.

The container 32 may be cylindrical in shape or any shape that matches the user's preferences and needs. The container 32 may be transparent, opaque, or solid depending on the contents stored and the user's needs. The container 32 may include a variety of materials such as plastic, glass, tin, metal, wood, rubber, screen material, perforated material, paper, and disposable bag-like material. The container 32 may also be divided into several compartments to meet the user's needs.

The seal 92 and/or the seal rib 96 keep the contents of the container 32 sealed tight against the support surface 24. The seal 92 and/or the seal rib 96 may be air tight depending on the materials used and end user preferences. The seal 92 and/or the seal rib 96 may be of a material that includes plastic, rubber, fabric, hook and loop fasteners, metal, or integrally formed with the rim assembly 28. The seal 92 and/or the seal rib 96 is also designed to provide a minimal amount of friction and surface area to allow for a smooth pull force by the user when accessing the container assembly 22.

The support surface 24 may be made of a magnetic stainless steel surface that can be affixed to any magnetic or non-magnetic surface the user desires. Typical horizontal surfaces that may receive the support surface 24 include, but are not limited to, undersides of shelves, undersides of wall cabinets and wall storage units, undersides of desk and counter top surfaces, hung on doors, clipped or hung on closet organizer systems, inside refrigerators, inside freezers and/or other storage systems. The support surface 24 may be built from a non-magnetic material and have sections of the support surface 24 designed to be magnetic (e.g., magnetic insets). The support surface 24 may be incorporated into a rack assembly designed to store spices, teas, fishing lures, or retail display items. By incorporating storage system 20 into the user's daily life, the storage system 20 allows the users to utilize often-unused space under shelves and cabinets, greatly increasing the inventory that can be displayed or consumed by the user. It is contemplated that the storage system 20 can also be utilized on the upper inside portion of a base cabinet. The base cabinet may have a door or a door with a drawer above it, as is typical in kitchen cabinets. When this location of mounting is desired by the user, a specialized bracket kit may be provided. The support surface 24 may be mounted to the face frame of a cabinet's box, and the specialized bracket may be provided to the user. The bracket gives the support surface 24 valuable support to keep a backside of the support surface 24 horizontal and parallel to the bottom of the drawer or counter top above it. The bracket supports the back and/or sides of the support surface 24 and permits easy attachment to the bottom and back of the cabinet face frame. The method for attaching the bracket assembly to the face frame may include hook and loop fasteners, screws, adhesive, or other suitable mounting methods. The support surface 24 in this location may also be installed using full-extension drawer slides. Full-extension drawer slides allow the user to store multiple container assemblies 22 without bending over to reach into the cabinet.

In one aspect of the present disclosure, the storage system 20 allows quick, convenient access to spices for more control and less mess. In addition to items being stored so they are quickly within reach, ease of access is equally as important to the overall user experience. The preferred method by many home cooks and professional chefs is to apply spices using one's fingertips, giving greater control to the amount and distribution of spices when cooking or baking. The wide mouth design of the rim assembly 28 allows easy access to the contents of the container 32, as well as one-handed access when working with raw ingredients, eliminating the need for repeatedly washing hands during food preparation.

With the storage system 20 of the present disclosure, teas and coffees can be stored directly above coffee and tea mugs, making use of underutilized and often wasted space directly under the shelf, and thus also freeing up premium cabinet shelf and counter top space. Additionally, the space under the shelf is at least substantially free of dust such that the contents of the container assembly 22 may be less prone to contamination with dust or other unwanted additions when compared to alternative approaches. In addition, with the storage system 20 of the present disclosure, dry smoothie and protein mixtures can be stored within easy reach. Millions of people are now mixing protein powders with chia seeds, almonds, and other healthy ingredients to blend together into smoothies they drink daily. One of the biggest problems with this process is the need to mix all the ingredients on a daily basis, getting out several large containers of bulk ingredients and making a small batch for consumption. Several problems can be solved with this storage system 20. Ingredients can be mixed ahead of time to allow quick access with grabbing one container instead of opening, one by one, several containers of varied ingredients, saving time and effort. The storage system 20 also allows large containers to be stored outside of the prime locations in the kitchen, not taking up valuable pantry or cupboard space.

Portion control can be a difficulty for some users. With the storage system 20 of the present disclosure, the user may place appropriate serving sized snacks in containers for easy access, maximizing the underutilized space within the pantry and cupboards. The pre-portioned quick access container assemblies 22 are also well suited for the working parent wanting to provide snacks for their children, and for those living the paleo life style of eating.

Professional chefs, restaurant cooks, and home cooks need ingredients at the ready for easy meal preparation. By taking advantage of the underutilized space on the bottom side of wire shelving units, range hoods, shelving units, and the like, the cooks can have rapid and easy access to items they utilize regularly. For example, spices and other ingredients may be stored in a quick access fashion, with the ingredients all ready to pinch and add.

The storage system 20 of the present disclosure may also be beneficial in outdoor storage environments. The storage system 20 can keep flies and critters away when storing food items outside while still allowing quick access to the container assemblies 22 and displaying the contents of the container assemblies 22. For example, the storage system 20 may be utilized in situations that include, but are not limited to, outdoor grilling, outdoor pizza ovens, picnics, camping, or outdoor markets.

The storage system 20 can be utilized on a variety of vessels that include, but are not limited to, marine vessels, kayaks, flight vessels, planes, helicopters, or for space travel. For example, the storage system 20 allows a fisherman to keep one hand on the line while accessing fishing lures or other needed items with the other hand. Often times, while trolling, lines can get tangled. By storing items securely and easily within reach on a boat or kayak, the user can be confident that the stored items will not move around on rough waters. Using wasted or underutilized space underneath dashboards, in rod storage areas, and other regions of the vessel is beneficial and desirable when the space is very limited on a vessel. The storage system 20 also keeps contents secure in the event of turbulence in air or sea.

In garage or shed storage environments, items for gardening (seed storage), fishing gear, hardware, small washers, nails, screws, and items generally stored in a garage, shed, or tool crib may be easily found and accessed by utilizing the storage system 20 of the present disclosure.

For users with pets, the storage system 20 may be utilized to store treats, medications, and/or food portions without having to bend over, find the food scoop, and access a large bag every day. Accordingly, the user may store one or more weeks' worth of dog food in portions using unused cupboard space.

In recent years bulk liquid soaps, such as laundry detergents, have been manufactured into pods for convenience. These pods pose a risk to small children when they are stored within their reach. The storage system 20 of the present disclosure can be used to place the laundry detergent, fabric softener chips, and other needed items out of reach of the children and in the most convenient location for the end user; by using the underutilized space on the underside of laundry cabinets, on the wall behind the washing machine, or on the wall adjacent to the washing machine. The storage system 20 offers quick access, time saving storage, and safe storage of harmful chemicals and allows the user to decrease the chances of children interacting with the harmful chemicals.

The storage system 20 may also be utilized in a bathroom setting. For example, the storage system 20 may be utilized in a bathroom vanity to store daily use items such as tooth floss picks, cotton swabs, cotton balls, and face wash pads. These daily use items are then kept in quick, convenient, visible areas rather than tucked away in linen closets, which may not be easily accessible, or stored on cluttered vanity surfaces and in drawers.

In a shower or bathtub, the storage system 20 may be attached to tile walls and glass doors for the storage of face creams, scrubs, bath salts, and the like to be easily within reach and out of the water.

In retail settings, the storage system 20 may be utilized for retail sales, such as retail counter sales, of spices, coffee, tea, small items, cannabis shops, candy shops, outdoor markets, and so on. The storage system 20 may be utilized anywhere the user wants to display retail items visibly while protecting the displayed product from the elements at the same time.

In office settings, office supplies such as paper clips, rubber bands, and flash drives may be stored under desks while maintaining easy access to the stored items at the workplace.

The storage system 20 may also be beneficial for individuals who experience limited dexterity or grip strength. For example, seniors, young children, or anyone who struggles with limited grip strength and dexterity may have difficulty opening lids and jars, which can be an everyday struggle and a barrier to independent living. The ease of access created by storage system 20 of the present disclosure, and the lack of a lid needing to be opened, creates a desirable solution for this population. In one example, pre-portioned items can be prepped and ready for grabbing. Various sizes of the container assemblies 22 can be produced to fit standard peanut butter jars, jam containers, nut containers, pickle jars, condiments, and the like to allow this population greater access to everyday items.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting. It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A storage system, comprising:
a rim assembly that is configured for selective attachment to a container to form a container assembly, wherein the rim assembly is configured for selective attachment to a support surface, wherein the rim assembly defines an upper aperture and a lower aperture, wherein the upper aperture and the lower aperture are each dimensioned to permit grasping dexterity within the container, and wherein the lower aperture is configured to receive an upper end of the container to which the rim assembly is configured to attach; and
one or more magnets positioned in the rim assembly.

2. The storage system of claim 1, wherein the upper aperture and the lower aperture are dimensioned to permit access to an interior of the container by a plurality of fingers of a user.

3. The storage system of claim 2, wherein the upper aperture and the lower aperture are dimensioned to permit removal of one or more items stored within the interior of the container while the user is grasping the one or more items with the plurality of fingers.

4. The storage system of claim 1, wherein the upper aperture has a diameter that substantially aligns with a diameter of an opening of the container to which the rim assembly is configured to attach.

5. The storage system of claim 1, wherein the one or more magnets are configured to be attracted to the support surface.

6. The storage system of claim 1, wherein an engagement between the rim assembly and the container is a threaded engagement.

7. The storage system of claim 1, wherein the rim assembly further comprises:
a channel that is configured to receive the one or more magnets.

8. The storage system of claim 1, wherein the rim assembly further comprises:
a seal rib that extends from a top surface of the rim assembly such that the container is sealed from an external environment upon interaction with the support surface.

9. The storage system of claim 1, wherein the upper aperture is provided with a leveling edge.

10. The storage system of claim 1, wherein a portion of the rim assembly that defines the lower aperture extends around the upper end of the container.

11. A storage system, comprising:
a rim assembly that is configured for selective attachment to a container to form a container assembly, wherein the rim assembly is configured for selective attachment to a support surface, wherein the rim assembly defines an upper aperture and a lower aperture, wherein the upper aperture has a diameter that substantially aligns with a diameter of an opening of the container to which the rim assembly is configured to attach, and wherein the lower aperture is configured to receive an upper end of the container to which the rim assembly is configured to attach, wherein the upper aperture and the lower aperture are each dimensioned to permit grasping dexterity through the opening and within the container; and
one or more magnets positioned in the rim assembly.

12. The storage system of claim 11, wherein the upper aperture and the lower aperture are dimensioned to permit access through the opening of the container by a plurality of fingers of a user.

13. The storage system of claim 12, wherein the upper aperture and the lower aperture are dimensioned to permit removal of one or more items stored within the container while the user is grasping the one or more items with the plurality of fingers.

14. The storage system of claim 11, wherein the one or more magnets are attracted to the support surface.

15. The storage system of claim 11, wherein the rim assembly further comprises:
a channel that is configured to receive the one or more magnets.

16. The storage system of claim 11, wherein the rim assembly further comprises:
a seal rib that extends from a top surface of the rim assembly such that the container is sealed from an external environment upon interaction with the support surface.

17. The storage system of claim 11, wherein the upper aperture is provided with a leveling edge.

18. The storage system of claim 11, wherein a portion of the rim assembly that defines the lower aperture extends around the upper end of the container.

19. A storage system, comprising:
a rim assembly that is configured for selective attachment to a container to form a container assembly, wherein the rim assembly is configured for selective attachment to a support surface, wherein the rim assembly defines an upper aperture and a lower aperture, wherein the upper aperture and the lower aperture are each dimensioned to permit grasping dexterity within the container, wherein the upper aperture has a diameter that substantially aligns with a diameter of an opening of the container to which the rim assembly is configured to attach, wherein the lower aperture is configured to receive an upper end of the container to which the rim assembly is configured to attach, wherein the upper aperture and the lower aperture are dimensioned to permit access to the container by a plurality of fingers of a user, wherein the upper aperture and the lower aperture are dimensioned to permit removal of one or more items stored within the container while the user is grasping the one or more items with the plurality of fingers; and one or more magnets positioned in the rim assembly.

\* \* \* \* \*